United States Patent

Nagai et al.

[11] Patent Number: 5,779,412
[45] Date of Patent: Jul. 14, 1998

[54] PROFILE FRAME AND CONNECTOR

[75] Inventors: Shigekazu Nagai; Koji Sugano, both of Yawara-mura, Japan

[73] Assignee: SMC Corporation, Tokyo, Japan

[21] Appl. No.: 848,307

[22] Filed: Apr. 30, 1997

[30] Foreign Application Priority Data

May 2, 1996 [JP] Japan .................. 8-134190

[51] Int. Cl.$^6$ .................. F16B 27/00; F16B 37/00
[52] U.S. Cl. .................. 411/85; 411/104; 411/432
[58] Field of Search .................. 411/84, 85, 88, 411/104, 432

[56] References Cited

U.S. PATENT DOCUMENTS

| | | | |
|---|---|---|---|
| 2,920,672 | 1/1960 | Bronson | 411/104 |
| 4,741,582 | 5/1988 | Peroni | 411/85 X |
| 4,948,313 | 8/1990 | Zankovich | 411/85 |
| 5,078,537 | 1/1992 | Nomura | 411/85 X |

Primary Examiner—Neill R. Wilson
Attorney, Agent, or Firm—Baker & Botts

[57] ABSTRACT

A nut (30) carried by a nut holder (11) is inserted into a dovetail groove (46) in a profile frame (45) to connect another profile frame or a mechanical component to the profile frame (45). The nut holder (11) has clamping portions (19A, 19B) at both longitudinal ends that extend in one direction at approximately right angles to a bottom member. Coupling projections (23) or recesses are formed on the inner sides of the clamping portions (19A, 19B). Elastically deformable portions (13) project from the sides of the bottom member. Abutments (34) are formed at both ends of the nut (30). When the nut (30) is coupled to the nut holder (11), the coupling projections (23) are engaged with the coupling recesses (34) to maintain the coupled state. When the nut (30) coupled to the nut holder (11) is inserted into the dovetail groove (46), the nut is maintained at a predetermined position in the groove by frictional force due to resilient force from the elastically deformable portions (13).

5 Claims, 6 Drawing Sheets

1

PROFILE FRAME AND CONNECTOR

BACKGROUND OF THE INVENTION

The present invention relates to an interconnecting device used to connect together a profile frame of continuous length and another profile frame or to connect a mechanical component to a profile frame such that the connected members can be disassembled. The present invention also relates to a component of the interconnecting device.

FIGS. 7a to 7d show a conventional interconnecting device and components thereof (for example, see Japanese Utility Model Application Post-Examination Publication No. 6-39137). A profile frame 6 of continuous length has a quadrangular sectional configuration. The profile frame 6 has a dovetail groove 7 provided in one side surface thereof. The dovetail groove 7 has an approximately crossshaped sectional configuration and extends in the longitudinal direction of the profile frame 6. A square nut 5 made of iron is combined with a nut holder 1 made of a synthetic resin material such that the square nut 5 is held by the nut holder 1. The combination of the square nut 5 and the nut holder 1 is inserted into the dovetail groove 7 for actual use. The nut holder 1 is formed from a plate member having a throughhole 2 provided in the center thereof. The opposite sides at two ends of the plate member are provided with engagement projections 3, respectively. It should be noted that the through-hole 2 is adapted to allow passage of the distal end portion of a bolt engaged with the square nut 5 if the bolt is excessively long. As shown in FIGS. 7a to 7c, the engagement projections 3 are formed by bending edge portions at two ends of the plate member constituting the nut holder 1. In FIG. 7b, left and right sides of the plate member that perpendicularly intersect the engagement projections 3 slightly protrude outward to form an elastically deformable portion 4. The maximum width of the elastically deformable portion 4 between the left and right sides is set slightly greater than the width of the dovetail groove 7 so that, when inserted into the dovetail groove 7, the elastically deformable portion 4 is elastically deformed by compression.

The square nut 5 is placed between the two engagement projections 3 of the nut holder 1. The square nut 5 and the nut holder 1 are inserted into the dovetail groove 7 of the profile frame 6, as shown in FIG. 7a. Because the width of the elastically deformable portion 4 between the sides perpendicularly intersecting the engagement projections 3 is slightly wider than the width of the dovetail groove 7, as the nut holder 1 is inserted into the dovetail groove 7, the elastically deformable portion 4 is elastically deformed in the direction of compression. Consequently, the sides of the elastically deformable portion 4 are placed in resilient contact with the opposing side walls of the dovetail groove 7. Thus, the square nut 5 is maintained at a desired position in the dovetail groove 7 by frictional force due to resilient force from the elastically deformable portion 4. The square nut 5 is supported by the nut holder 1, and the nut holder 1 per se presses the side walls of the dovetail groove 7 to remain at the desired position. Accordingly, the square nut 5 per se is not pressed against the side walls of the dovetail groove 7. Therefore, when the square nut 5, together with the nut holder 1, is inserted into the dovetail groove 7, the square nut 5 will not damage the dovetail groove 7. Moreover, the inserted nut holder 1 has moderate slidability, which enables the position of the square nut 5 to be readily corrected even if the square nut 5 is slightly displaced relative to the bolt.

As shown in FIG. 7d, another profile frame 6A or a mechanical component is secured to the profile frame 6 by using square nuts 5, bolts 8, a coupling member 9, etc.

SUMMARY OF THE INVENTION

With the conventional nut holder 1, the sides of the elastically deformable portion 4 are placed in resilient contact with the side walls of the dovetail groove 7.

Because the elastically deformable portion 4 is not readily elastically deformed in the direction of compression, as the sides of the nut holder 1 and the side walls of the dovetail groove 7 wear, the resilient force rapidly decreases, making it difficult to place the nut holder 1 in resilient contact with the side walls of the dovetail groove 7. Moreover, because there is no device for coupling the square nut 5 and the nut holder 1 to each other, it is necessary at a job site to place the square nut 5 between the two engagement projections 3 of the nut holder 1 to thereby combine them together and then insert the combination of the square nut 5 and the nut holder 1 into the dovetail groove 7.

A first object of the present invention is to provide a profile frame or mechanical component interconnecting device and a component thereof, wherein resilient force from the elastically deformable portion of the nut holder is prevented from reducing even if contact portions of the nut holder and the dovetail groove wear.

A second object of the present invention is to provide a profile frame or mechanical component interconnecting device and a component thereof, wherein the nut holder and the nut are coupled together in advance, thereby making it unnecessary to assemble them together at a job site.

BRIEF DESCRIPTION OF THE INVENTION

FIGS. 1a to 1e show a nut holder according to a first embodiment of the present invention, in which: FIG. 1a is a plan view; FIG. 1b is a bottom view; FIG. 1c is a front view; FIG. 1d is a side view; and FIG. 1e is a perspective view.

FIGS. 2a to 2c show a nut according to the first embodiment of the present invention, in which: FIG. 2a is a plan view; FIG. 2b is a side view; and FIG. 2c is a perspective view.

Figure 5A:
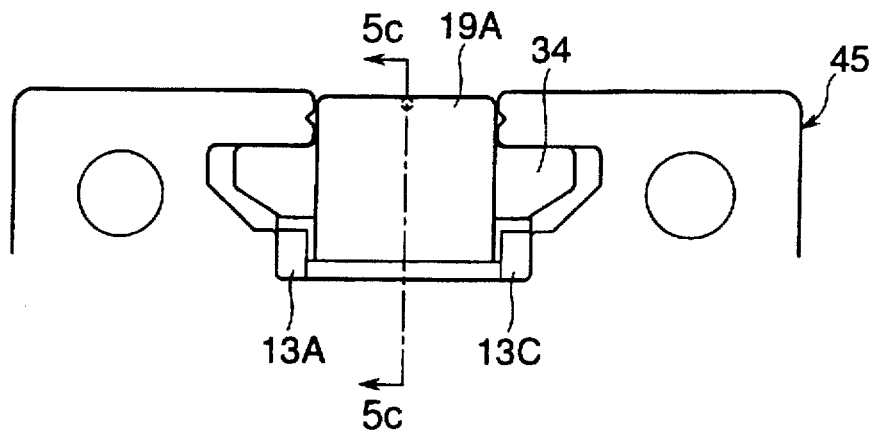
Figure 5B:
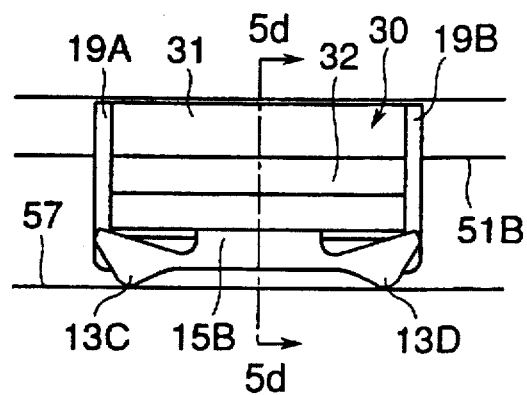
Figure 5C:
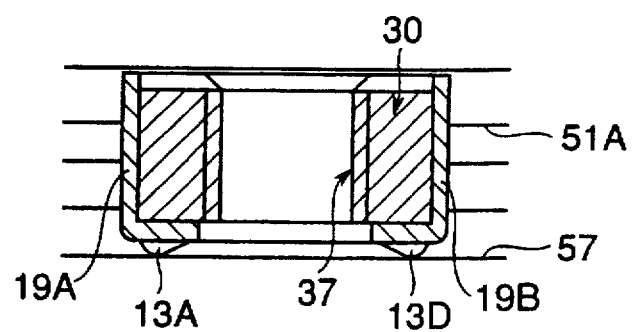
Figure 5D:
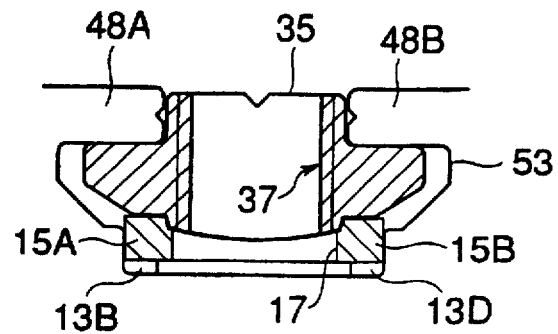

FIGS. 5a to 5d show a coupled assembly of the nut and nut holder according to the first embodiment of the present invention, the coupled assembly being inserted in the profile frame, in which: FIG. 5a is a side view; FIG. 5b is a front view; FIG. 5c is a sectional view taken along the line c—c in FIG. 5a; and FIG. 5d is a sectional view taken along the line d—d in FIG. 5b.

Figure 6A:
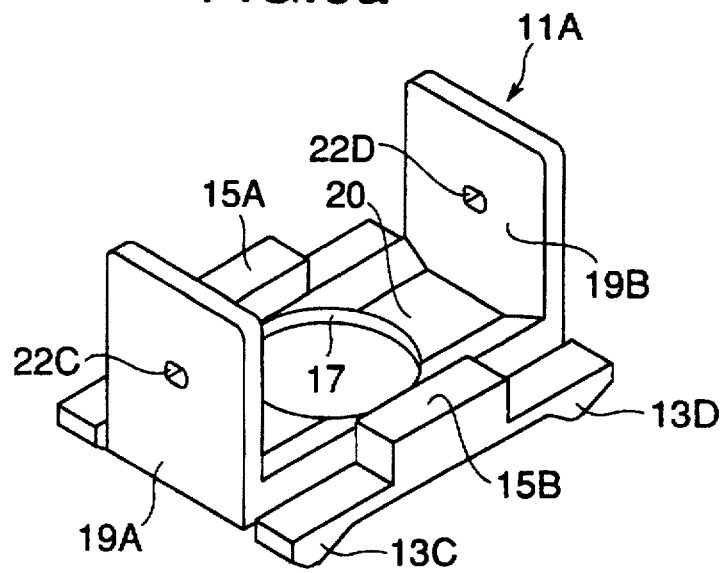

FIG. 6a is a perspective view of a nut holder according to the second embodiment of the present invention.

Figure 6B:
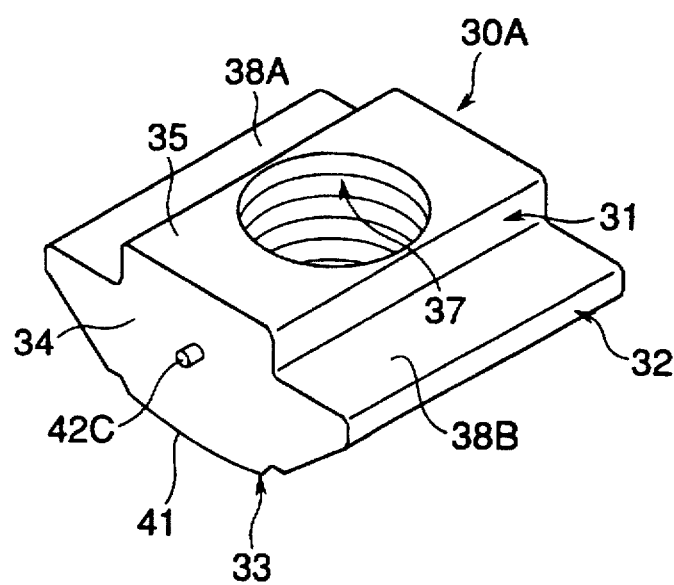

FIG. 6b is a perspective view of a nut according to the second embodiment of the present invention.

Figure 7A:
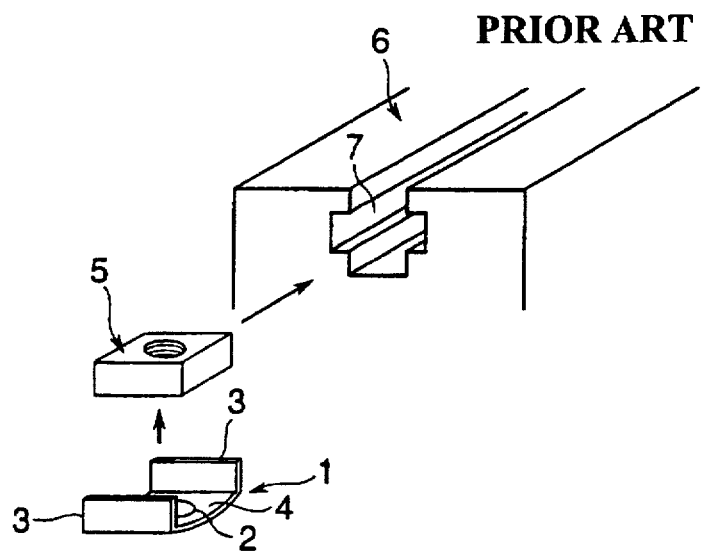

FIG. 7a is a perspective view showing the way in which a conventional nut and nut holder are applied to a profile frame.

Figure 7B:
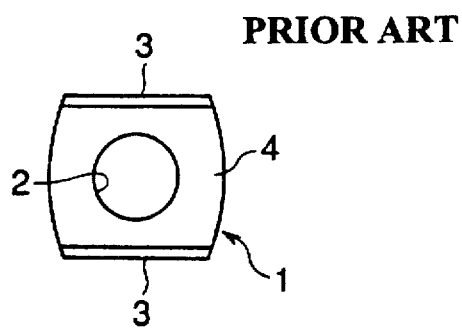

FIG. 7b is a plan view of the conventional nut holder.

Figure 7D:
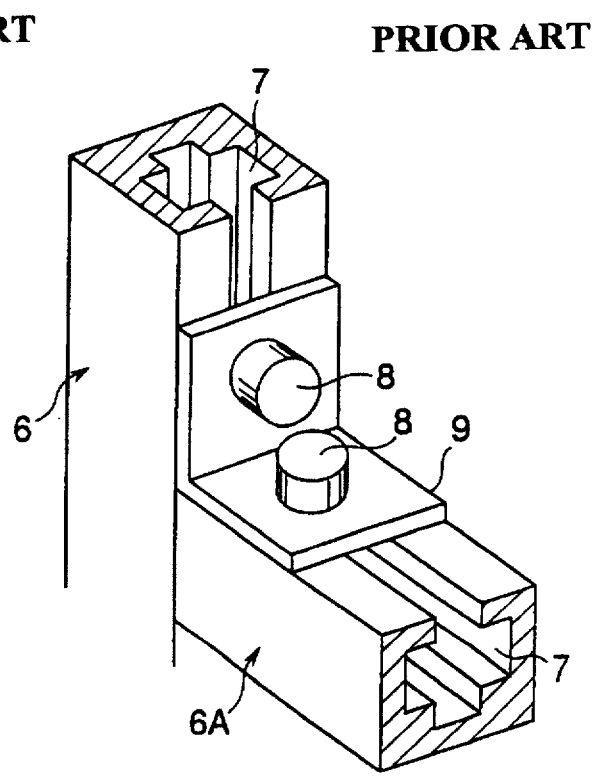
Figure 7C:
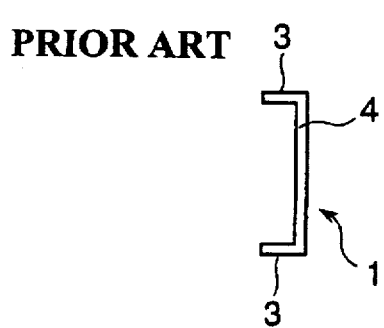

FIG. 7c is a side view of the conventional nut holder.

FIG. 7d is a perspective view showing the conventional nut and nut holder as used.

DESCRIPTION OF THE PREFERRED EMBODIMENTS

FIGS. 1a to 5d show a first embodiment of the present invention. As shown in FIGS. 1a to 1e, a nut holder 11 according to the first embodiment of the present invention is integrally molded from a synthetic resin material (e.g. polyacetal) or a metal. In the following description of the nut holder 11, the direction X in FIG. 1a will be referred to as "the longitudinal direction", and the direction Y in FIG. 1a (the horizontal direction as viewed in FIG. 1d) will be referred to as "the lateral direction".

The nut holder 11 has a coupling central portion 12 inside the two lateral ends of the nut holder 11. The coupling central portion 12 is approximately rectangular as viewed in a plan. A bottom member 20 constituting the coupling central portion 12 has a through-hole 17 provided in the center thereof. A pair of plate-shaped clamping portions 19A and 19B are integrally formed at both longitudinal ends, respectively, of the bottom member 20. The clamping portions 19A and 19B extend upward (in one direction) at approximately right angles to the bottom member 20. The top surface of the bottom member 20 may be a flat surface. However, it is preferable to shape the top surface of the bottom member 20 so that the mechanical strength of the coupling central portion 12 is increased. That is, as shown by the dotted line in FIG. 1d (also shown in FIG. 1e), the top surface of the bottom member 20 is concavely recessed in a side view, and the lateral center portion of the top surface of the bottom member 20 is flat, while the two lateral end portions are slanted. A pair of approximately hemispherical coupling projections 23A and 23B are integrally formed on the clamping portions 19A and 19B at respective positions in the central portions of the upper ends of the inner sides of the clamping portions 19A and 9B. It should be noted that the position and configuration of the coupling projections 23A and 23B may be set so that, when a nut 30 (described later) is coupled to the nut holder 11, the coupling projections 23A and 23B are engaged with respective coupling recesses of the nut 30 to maintain the coupled state of the nut 30 and the nut holder 11.

The nut holder 11 has position regulating portions 15A and 15B and elastically deformable portions 13A to 13D formed outside (on both sides of) the coupling central portion 12. The position regulating portions 15A and 15B each have a predetermined length in the longitudinal direction and a predetermined height (i.e. the position regulating portions 15A and 15B extend upward above the top surface of the bottom member 20). When the nut 30 is placed and supported on the nut holder 11, the position regulating portions 15A and 15B regulate the position of the nut 30 so that the nut 30 will not move in the lateral direction. The elastically deformable portions 13A and 13B are deformably connected to both longitudinal ends, respectively, of the position regulating portion 15A. Similarly, the elastically deformable portions 13C and 13D are deformably connected to both longitudinal ends, respectively, of the position regulating portion 15B. Thus, four slit-shaped gaps 24A to 24D are formed between the coupling central portion 12 and the four elastically deformable portions 13A to 13D. The elastically deformable portions 13A to 13D each have a projection extending downward (in the other direction) to press against a bottom surface 57 of a dovetail groove 46 (described later). The elastically deformable portions 13A to 13D each have an appropriate lateral width and an appropriate longitudinal length. It is necessary for the joints of the coupling central portion 12 and the elastically deformable portions 13A to 13D to have an appropriate thickness so that, when the nut holder 11 coupled with the nut 30 is inserted into the dovetail groove 46, the nut holder 11 slides with ease and is surely maintained at a predetermined position.

Figure 1A:
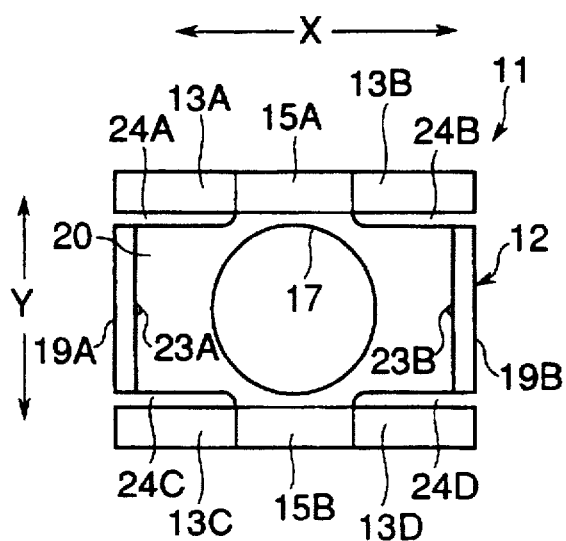
Figure 1B:
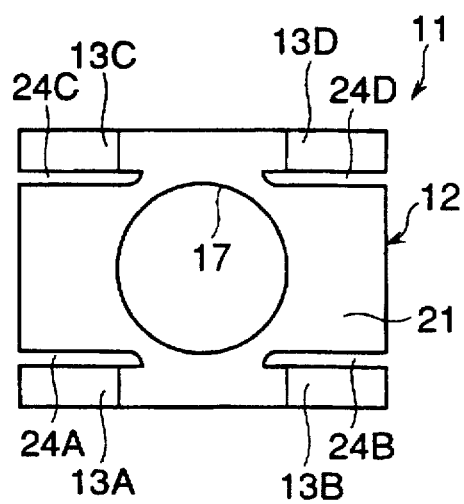
Figure 1C:
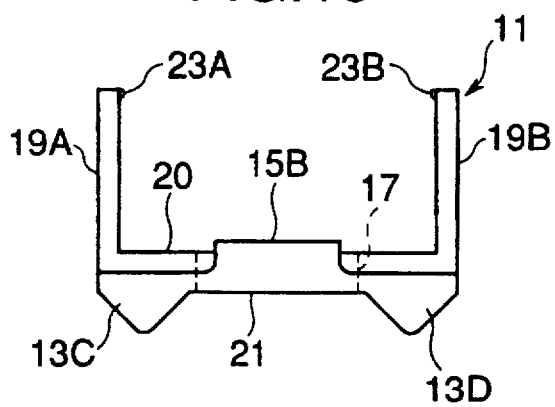
Figure 1D:
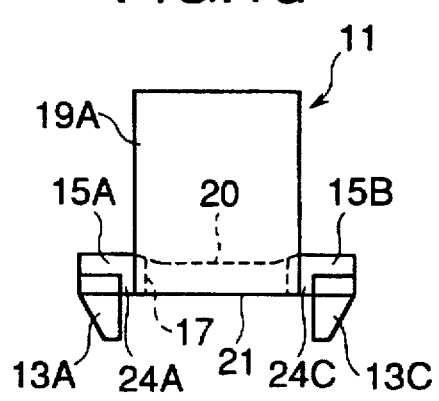
Figure 1E:
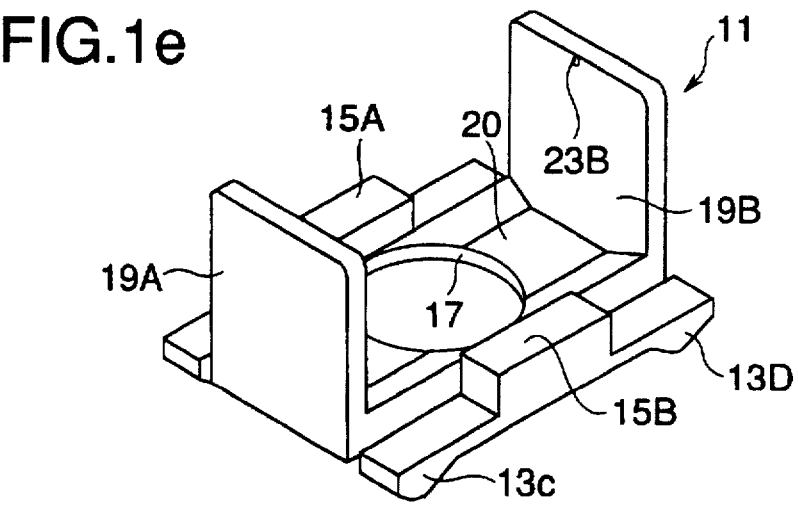
Figure 2A:
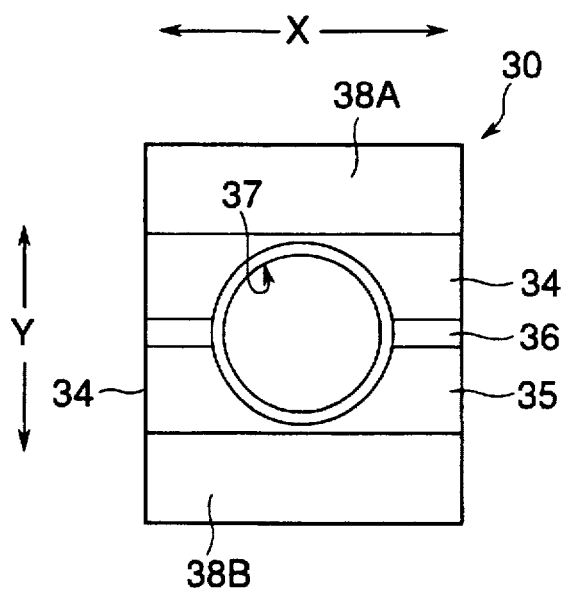
Figure 2B:
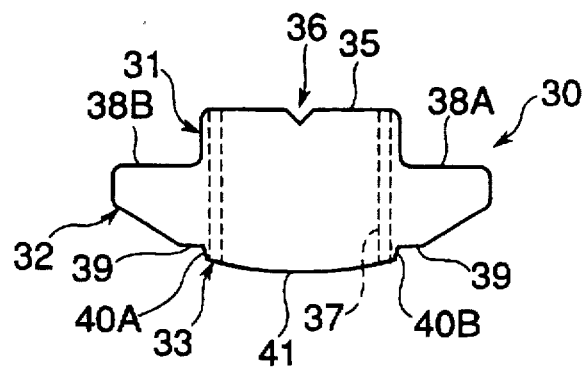
Figure 2C:
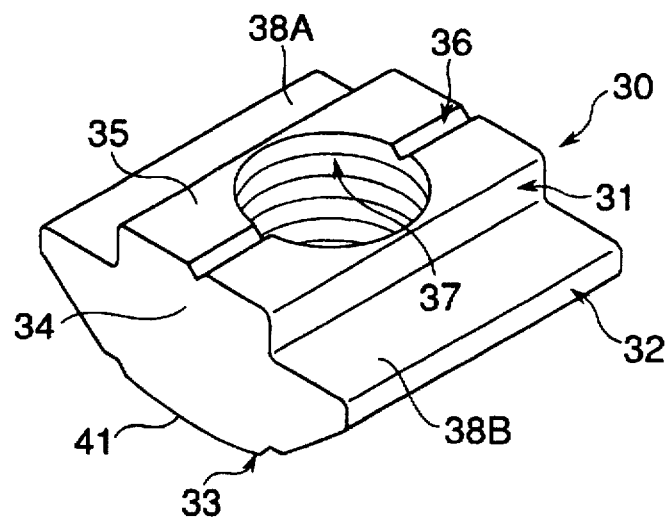

According to the first embodiment, as shown in FIG. 1c, the elastically deformable portions 13A to 13D each have an approximately isosceles triangle-shaped configuration in a front view. The vertex of each of the elastically deformable portions 13A to 13D projects downward beyond a back surface 21 of the bottom member 20. As shown in FIG. 1d, the lateral width of each of the elastically deformable portions 13A to 13D gradually decreases as the distance from the upper end increases toward the lower end. The nut holder 11 is approximately rectangular as a whole in a plan view. The lateral width of the nut holder 11 is slightly smaller than the width of the bottom of the dovetail groove 46 (described later). When the nut holder 11 shown in FIGS. 1a to 1c and the nut 30 shown in FIGS. 2ato 2c are coupled together, the nut 30 is placed and supported on the top surfaces of the position regulating portions 15A and 15B of the nut holder 11. However, the nut holder 11 may be arranged such that the nut 30 is placed and supported on the top surface of the bottom member 20.

As shown in FIGS. 2a to 2c, the nut 30 according to the first embodiment of the present invention has a sectional configuration as shown in FIG. 2b. The nut 30 has an internal thread 37 formed in the center thereof. The nut 30 can be produced as follows: A metallic material (e.g. iron) is formed into a sectional configuration as shown in FIG. 2b by drawing. The drawn material is cut into a predetermined length and then provided with an internal thread 37. It is also possible to produce the nut 30 by molding a metal or synthetic resin material. In the following description of as the nut 30, the direction X in FIG. 2a will be referred to as "the longitudinal direction", and the direction Y in FIG. 2a will be referred to as "the lateral direction".

The nut 30 shown in FIG. 2a is quadrangular as viewed in a plan. As viewed in the side view of FIG. 2b, the nut 30 has an upper projecting portion 31, a central wide portion 32, and a lower projecting portion 33, which are integral with each other. A longitudinally extending V-groove 36 is formed in the lateral center of a top surface 35 of the upper projecting portion 31. The internal thread 37 is formed in the longitudinal center of the V-groove 36. The two longitudinal end surfaces of the nut 30 are formed as abutments 34 that abut on the clamping portions 19A and 19B, respectively, of the nut holder 11 to restrain longitudinal movement of the nut 30. It should be noted that the abutments 34 need not necessarily extend over the whole longitudinal end surfaces, and that each abutment 34 may be formed from a part of the associated end surface of the nut 30. Further, the nut 30 need not necessarily be quadrangular as viewed in a plan.

In actual use, as shown in FIGS. 4 and 5a to 5d, the nut 30 is coupled to the nut holder 11 to form a coupled assembly, and the coupled assembly of the nut 30 and the nut holder 11 is inserted longitudinally into the dovetail groove 46 of a profile frame 45. The longitudinal length of the nut 30 is set equal to the longitudinal distance between the opposing inner sides of the clamping portions 19A and 19B of the nut holder 11. The lateral width of the lower projecting portion 33 of the nut 30 is set equal to the lateral distance between the opposing inner sides of the position regulating portions 15A and 15B of the nut holder 11. To couple the nut 30 to the nut holder 11, as shown in FIGS. 4 and 5a to 5d, the nut 30 and the nut holder 11 are oriented in the same direction, and the nut 30 is inserted into the space between the clamping portions 19A and 19B of the nut holder 11 from above it. When the nut 30 passes between the coupling projections 23A and 23B of the clamping portions 19A and 19B, the clamping portions 19A and 19B are elastically deformed outwardly to allow the passage of the nut 30. Next, horizontal portions 39 of the central wide portion 32 of the nut 30 come in contact with the respective top surfaces of the position regulating portions 15A and 15B of the nut holder 11. When vertical surfaces 40A and 40B at both lateral ends of the lower projecting portion 33 of the nut 30 are fitted to the lateral inner sides of the position regulating portions 15A and 15B of the nut holder 11, the coupling projections 23A and 23B are engaged with the respective coupling recesses at both ends of the V-groove 36 of the nut 30 by resilient force from the clamping portions 19A and 19B, thereby enabling the nut 30 and the nut holder 11 to be maintained in the coupled state.

In the coupled state, lateral movement of the nut 30 is restrained by the position regulating portions 15A and 15B of the nut holder 11, and longitudinal movement of the nut 30 is restrained by the clamping portions 19A and 19B of the nut holder 11. The lateral width of the upper projecting portion 31 of the nut 30 is set equal to the lateral width of the clamping portions 19A and 19B of the nut holder 11. When the nut 30 and the nut holder 11 are coupled together, the top surface 35 of the upper projecting portion 31 of the nut 30 lies above the upper ends of the clamping portions 19A and 19B of the nut holder 11. The arrangement may be such that in the coupled state a bottom surface 41 of the nut 30 is placed in contact with the top surface of the bottom member 20 of the nut holder 11, and a gap is provided between the horizontal bottom portions 39 of the central wide portion 32 of the nut 30 and the top surfaces of the position regulating portions 15A and 15B of the nut holder 11. The arrangement may also be such that the V-groove 36 of the nut holder 11 is omitted, but instead, a coupling recess (e.g. a recessed portion, a blind hole, or a laterally elongate groove) is formed in the upper end or intermediate portion of each of the abutments 34 at both ends of the nut 30. The nut 30 and the nut holder 11 are firmly coupled together and will not separate from each other during an ordinary operation, e.g. storage or transportation. Accordingly, the coupled assembly can be handled as a single component.

Figure 3:
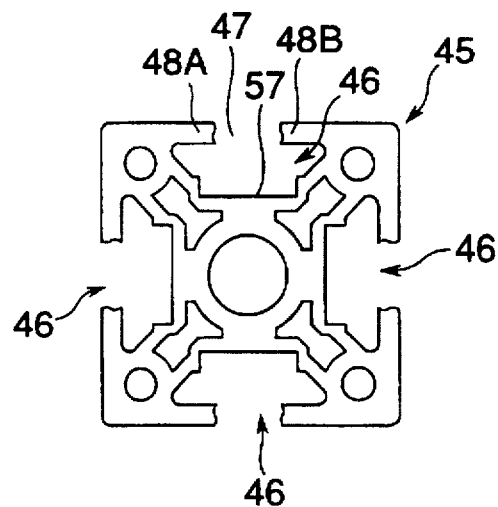
FIG. 3 is a sectional view of a profile frame to which the first and second embodiments of the present invention are applied.
Figure 4:
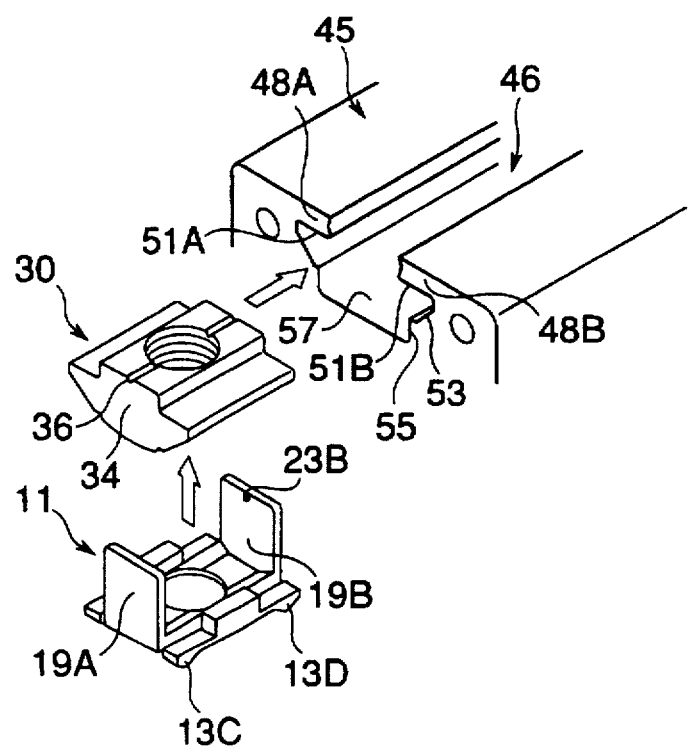
FIG. 4 is a perspective view showing the way in which the nut and nut holder according to the first embodiment of the present invention are applied to the profile frame.

As shown in FIGS. 3 and 4, each side of the profile frame 45 is provided with a longitudinally extending dovetail groove 46. The sectional configuration of the dovetail groove 46 is similar to that of the nut 30. The dovetail groove 46 has, in order from the surface of the profile frame 45, an opening portion 47, a central wide portion 53, and a bottom narrow portion 55. The opening portion 47 is the gap between the opposing ends of collars 48A and 48B at the upper end of the dovetail groove 46. The central wide portion 53 lies under the collars 48A and 48B of the dovetail groove 46. The lateral width of the upper projecting portion 31 of the nut 30 and the lateral width of the clamping portions 19A and 19B of the nut holder 11 are slightly smaller than the width of the opening portion 47, and the height of the upper projecting portion 31 is slightly smaller than the vertical width of the collars 48A and 48B. Accordingly, when the coupled assembly of the nut 30 and the nut holder 11 is inserted into the dovetail groove 46, the upper projecting portion 31 and the clamping portions 19A and 19B are inserted into the opening portion 47 of the dovetail groove 46. In the inserted state, neither the upper end of the upper projecting portion 31 nor the upper ends of the clamping portions 19A and 19B project out upwardly above the opening portion 47. It should be noted that the clamping portions 19A and 19B of the nut older 11 need not necessarily be inserted into the opening portion 47.

The lateral width of the central wide portion 53 of the dovetail groove 46 is slightly wider than that of the central wide portion 32 of the nut 30. The lateral width of the bottom narrow portion 55 of the dovetail groove 46 is slightly wider than the lateral width of the nut holder 11 that is defined by the position regulating portions 15A and 15B and elastically deformable portions 13A to 13D of the nut holder 11. As shown in FIGS. 5a to 5d, when the coupled assembly of the nut 30 and the nut holder 11 is inserted into the dovetail groove 46, the elastically deformable portions 13A to 13D of the nut holder 11 are deformed away from the bottom surface 57 about the respective joints, causing resilient force to act on the bottom surface 57. A reaction to the action of resilient force presses the top surfaces 38A and 38B of the central wide portion 32 of the nut 30 against the upper wall surfaces 51A and 51B of the dovetail groove 46 (i.e. the lower surfaces of the collars 48A and 48B), causing frictional force to occur. The frictional force enables the coupled assembly of the nut 30 and the nut holder 11 to be slid by external force and maintained at a desired position in the dovetail groove 46 regardless of the tilt of the profile frame 45.

FIGS. 6a and 6b show a second embodiment of the present invention. In the second embodiment, the same members or portions as those in the first embodiment are denoted by the same reference characters, and a description thereof is omitted. In the first embodiment of the present invention, coupling projections are formed on the respective inner sides of the clamping portions 19A and 19B of the nut holder 11, and coupling recesses are formed on the abutments 34 at the two longitudinal ends of the nut 30. In contrast, according to the second embodiment, coupling projections 42C (projections having an arbitrary shape) are formed on the abutments 34 at the two longitudinal ends of the nut 30A, and coupling recesses 22C and 22D (e.g. through-holes, blind holes, laterally elongate grooves, or recessed portions) are formed on the clamping portions 19A and 19B, respectively, of the nut holder 11A. The second embodiment is suitable in a case where the nut 30A is molded from a synthetic resin material.

According to a first aspect of the present invention, when the nut is coupled to the nut holder, the coupling projections are engaged with the respective coupling recesses to maintain the nut and the nut holder in the coupled state. When the nut coupled to the nut holder is inserted into a dovetail groove of a profile frame, the nut is maintained at a desired position by frictional force due to resilient force from elastically deformable portions provided to project so as to be capable of bending deflection. Accordingly, even if contact portions in the area of contact between the elastically deformable portions of the nut holder and the dovetail groove wear, there is no reduction in resilient force from the elastically deformable portions, which are provided to be capable of bending deflection. Moreover, because the nut and the nut holder can be firmly coupled together, it will be unnecessary to assemble them together at a job site if the nut and the nut holder are coupled together in advance in a factory or the like and the coupled assembly is stored or transported as a single component.

According to a second aspect of the present invention, when the nut coupled to the nut holder is inserted into the dovetail groove, the top end of the upper projecting portion of the nut lies in the opening portion of the dovetail groove. Accordingly, the outer end of the internal thread of the nut comes close to the surface of the profile frame. Therefore, even if a bolt used to connect a mechanical component or the like to the profile frame is shorter in length than those conventionally used, the bolt can be engaged with the nut. Thus, it is possible to use bolts similar in length to those conventionally used and also bolts slightly shorter than them; therefore, the interconnecting device becomes correspondingly easy to use.

According to a third aspect of the present invention, when the nut is coupled to the nut holder, the lower projecting portion of the nut is inserted between the two position regulating portions of the nut holder, and thus lateral movement of the nut is restrained. Moreover, the nut and the nut holder are coupled together by engagement between the coupling projections and the coupling recesses.

Therefore, when the coupled assembly is inserted into a dovetail groove in a profile frame, the nut lies in the lateral center of the dovetail groove. Moreover, the top surface of the upper projecting portion of the nut is parallel to the surface of the profile frame. Accordingly, a bolt inserted in a direction perpendicular to the surface of the profile frame approaches the internal thread of the nut at an accurate angle and surely engages with the internal thread. Therefore, the coupling operation efficiency increases.

According to a fourth aspect of the present invention, a coupled assembly of a nut and a nut holder is provided. The coupled assembly, which has the same advantages as those of the first aspect of the present invention, can be handled as a completed component.

According to a fifth aspect of the present invention, a nut holder for a nut is provided. The use of the nut holder makes it possible to obtain the same advantages as those of the first aspect of the present invention.

What is claimed is:

1. In an interconnecting device of the type wherein a nut is inserted into a dovetail groove in a profile frame to connect another profile frame or a mechanical component to said profile frame by using said nut, the improvement which comprises a nut holder having clamping portions formed at both longitudinal ends, respectively, of a bottom member of said nut holder, said clamping portions extending in one direction at approximately right angles to said bottom member, said clamping portions having coupling projections or recesses respectively formed on inner sides thereof, said nut holder further having elastically deformable portions projecting in the other direction from both longitudinally extending sides, respectively, of said bottom member such that said elastically deformable portions are capable of bending deflection, and wherein said nut has abutments respectively formed at both longitudinal ends thereof, said abutments being provided with coupling recesses or projections, respectively, so that when said nut is coupled to said nut holder, said coupling projections are engaged with said coupling recesses to maintain said nut and said nut holder in a coupled state, and when said nut coupled to said nut holder is inserted into said dovetail groove, said nut is maintained at a predetermined position by frictional force due to resilient force from said elastically deformable portions.

2. The improvement according to claim 1, wherein, when said nut coupled to said nut holder is inserted into said dovetail groove, a top end of an upper projecting portion of said nut lies in an opening portion of said dovetail groove.

3. The improvement according to claim 1 or 2, wherein said nut holder has two position regulating portions respectively formed at centers of the longitudinally extending sides of said bottom member, said elastically deformable portions being respectively connected to both longitudinal ends of said position regulating portions, and wherein said nut has a lower projecting portion, so that, when said nut is coupled to said nut holder, said lower projecting portion of said nut is inserted between said two position regulating portions of said nut holder to restrain lateral movement of said nut, and wherein said coupling projections or recesses are respectively formed on distal ends of said clamping portions of said nut holder, and said coupling recesses or projections are respectively formed on upper ends of said abutments of said nut.

4. A coupled assembly comprising a nut and a nut holder, said coupled assembly being inserted into a dovetail groove in a profile frame to connect another profile frame or a mechanical component to said profile frame, wherein said nut holder has clamping portions formed at both longitudinal ends, respectively, of a bottom member of said nut holder, said clamping portions extending in one direction at approximately right angles to said bottom member, said clamping portions having coupling projections or recesses respectively formed on inner sides thereof, said nut holder further having elastically deformable portions projecting in the other direction from both longitudinally extending sides, respectively, of said bottom member such that said elastically deformable portions are capable of bending deflection, and wherein said nut has abutments respectively formed at both longitudinal ends thereof, said abutments being provided with coupling recesses or projections, respectively, so that when said nut is coupled to said nut holder, said coupling projections are engaged with said coupling recesses to maintain said nut and said nut holder in a coupled state.

5. A nut holder for a nut that is inserted into a dovetail groove in a profile frame to connect another profile frame or a mechanical component to said profile frame, said nut holder comprising:

a bottom member;

clamping portions formed at both longitudinal ends, respectively, of said bottom member, said clamping portions extending in one direction at approximately right angles to said bottom member;

coupling projections or recesses respectively formed on inner sides of said clamping portions;

position regulating portions respectively formed at centers of longitudinally extending sides of said bottom member; and elastically deformable portions respectively provided at both longitudinal ends of said position regulating portions, said elastically deformable portions projecting in the other direction such that said elastically deformable portions are capable of bending deflection.

* * * * *